Dec. 29, 1953  H. O. WAAG ET AL  2,663,911
METHOD OF DECORATING PLASTICS
Filed June 27, 1951

INVENTORS
HARRY O. WAAG
STANLEY R. PRANCE
BY Willits Hardman & Fehr
THEIR ATTORNEYS Patented Dec. 29, 1953

2,663,911

UNITED STATES PATENT OFFICE 2,663,911

METHOD OF DECORATING PLASTICS

Harry O. Waag and Stanley R. Prance, Dayton, Ohio, assignors to General Motors Corporation, Detroit, Mich., a corporation of Delaware Application June 27, 1951, Serial No. 233,716

1 Claim. (Cl. 18—61)

This invention relates to a method for decorating plastic materials and is particularly directed to a method for forming textured surfaces on molded plastic articles.

It is well a known fact that the molds used for molding plastic articles may have textured surfaces thereon whereby the surface of the article molded is textured in one way or another. However, such molds lose their sharpness of outline after continued use and furthermore, texturing the surface of a mold is an expensive procedure. Then too, it is often desirable to form articles in a mold, some of which will ultimately have a textured surface and some which will not or will have a surface of different texture than other articles to be made.

It is, therefore, particularly desirable to provide a method for texturing the surface of molded plastic articles wherein said surface may be provided on the article after the article is molded. We have found that molded plastic articles, such as articles made from cellulose nitrate, cellulose acetate, cellulose acetate butyrate, ethyl cellulose, methyl methacrylate, etc., and in fact, any of the thermoplastic materials may be textured over the entire surface thereof, or at selected portions thereof, by a simple and effective procedure to be described hereinafter.

It is, therefore, the object of this invention to provide a method for applying a texturing surface to a molded thermoplastic article wherein the texture of cloth, leather, etc., may be simulated either on the entire surface or on selected portions of the articles.

Further objects and advantages of the present invention will be apparent from the following description, reference being had to the accompanying drawing, wherein preferred embodiments of the present invention are clearly shown.

In the drawing:

Figs. 3 through 7 show diagrammatically the steps in the method of texturing a portion of the wheel as shown in Fig. 2, wherein Fig. 3 depicts the step of wrapping a piece of cloth around the wheel.

Fig. 4 shows the step of moistening the cloth with a suitable solvent.

Figure 5:
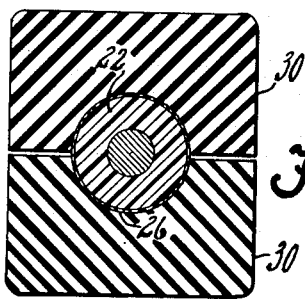

Fig. 5 diagrammatically illustrates the application of pressure to the solvent carrying cloth.

Figure 6:
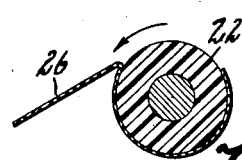

Fig. 6 shows the step of stripping the cloth from the textured surface of the wheel rim.

Figure 7:

Fig. 7 illustrates the step of spray-painting the textured portion.

Figure 1:
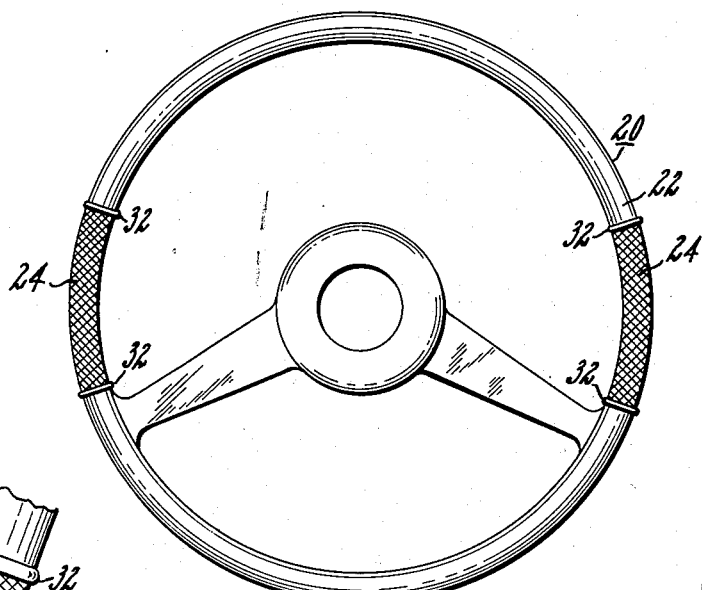
Fig. 1 is a view of a steering wheel.
Figure 2:
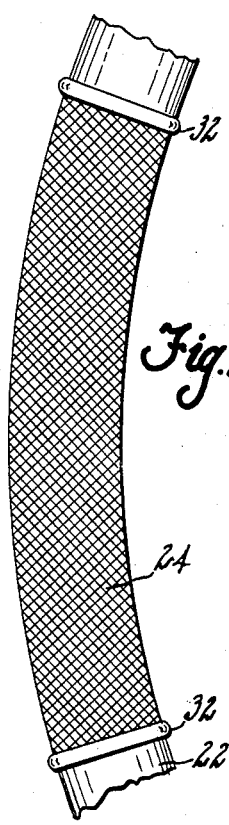
Fig. 2 is an enlarged, fragmentary view of the rim of said wheel, showing a textured portion thereof.
Figure 3:
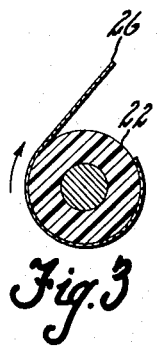
Figure 4:
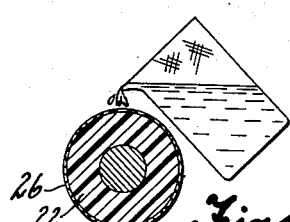

In the texturing of the surface or a selected portion of the surface of a plastic article made from any suitable plastic material, we have found that by using a piece of cloth or other woven material having a defined texture or by using a piece of leather or the like, it is possible to transfer the texture of the cloth or leather to the surface of a molded thermoplastic article. This is accomplished by pressing the cloth tightly against the surface of an article to be textured, for example, a steering wheel 20 as shown in Fig. 1, which includes a rim 22. If it is desired to texture this rim at the grip portions 24 thereof, a piece of cloth, leather or other material, having a desired texture 26, is wrapped around the wheel rim 22 at a selected portion as shown in Fig. 3. This texturing material 26 is then saturated with a solvent for the thermoplastic used as noted in Fig. 4. This may be poured on, sprayed on or in some cases, the texturing material 26 may be saturated with the solvent prior to being wrapped or impressed upon the surface of the molded article. Any of the well known solvents, such as acetone, amyl acetate, ethyl acetate, compatible mixtures, etc., are suitable for this purpose. After the texturing material 26 is saturated with the solvent, pressure means, indicated by blocks of resilient material 30, as shown in Fig. 5, may be used to uniformly compress the material against the surface of the article to be textured, in this case, the rim 22 of the wheel 20. The time for applying pressure is best arrived at by trial, although, when using a volatile solvent, the time is more or less self-regulated. In any event, it will be noted, upon removal of the pressure blocks 30 and the stripping off of the texturing material 26, as shown in Fig. 6, that the surface of the wheel rim 22 has now assumed the texture of the texturing material 26 as noted at 24 in Fig. 1 or the enlarged view, Fig. 2. In this case, a coarsely woven cloth was used, although, as previously mentioned, any suitable texturing material to yield the desired impressed surface, may be substituted therefor.

After the textured portion 24 of the plastic has hardened, due to complete evaporation of the solvent, the textured portion may be finished in a different color than the remaining portions of the wheel. In this case, if the textured portion is spray-painted with a leather brown finish, it is very difficult to distinguish the textured portion from real leather. In order to completely finish the textured portion of the rim, polished metal rings 32 may be provided.

The method described herein eliminates the mold parting line always apparent when molded textured surfaces are formed on objects wherein a parting line is required in the mold. This improved method therefore enhances the ultimate appearance of the textured portion and increases the illusion that the textured part is applied material.

While this entire disclosure has been directed to the texturing of a selected portion of a steering wheel, it is understood that the entire wheel rim can be textured, if desired, or any other plastic object, such as a box, match case, cigarette holder, etc., may be treated in a similar manner either over the entire surface thereof or at any selected portion thereof. In each case, the textured part is preferably finished with a different colored paint or lacquer to bring out the beauty of the textured surface.

While the embodiments of the present invention as herein disclosed, constitute preferred forms, it is to be understood that other forms might be adopted.

What is claimed is as follows:

In a method for ornamentally decorating a reinforced plastic steering wheel made from thermoplastic material wherein simulated leather hand grips are provided on the rim portion thereof, the steps comprising; wrapping an absorbent material having a leather-like grain around the portions of the rim to be textured, applying solvent for said thermoplastic to said absorbent material, firmly pressing the solvent ladened material into the surface of the rim for transferring the leather-like grain from the material to the rim surface, removing the texturing material, then suitably finishing the textured surface.

HARRY O. WAAG.
STANLEY R. PRANCE.

References Cited in the file of this patent

UNITED STATES PATENTS

| Number | Name | Date |
|---|---|---|
| 1,744,829 | Dreyfus | Jan. 28, 1930 |
| 2,442,405 | Fornwalt | June 1, 1948 |

OTHER REFERENCES

Fingerprinting Surfaces on Film, Pop. Mechanics, February 1946, pages 60 to 62.